United States Patent [19]

Minematsu et al.

[11] 4,294,946
[45] Oct. 13, 1981

[54] LOW RESIDUAL MONOMER α-METHYLSTYRENE-ACRYLONITRILE COPOLYMERS AND ABS BLENDS THEREFROM

[75] Inventors: Hiroyuki Minematsu, Niihama; Kojiro Matsumoto, Takarazuka; Tadashi Saeki; Akira Kishi, both of Niihama, all of Japan

[73] Assignee: Sumitomo Naugatuck Co., Ltd., Japan

[21] Appl. No.: 170,203

[22] Filed: Jul. 21, 1980

Related U.S. Application Data

[63] Continuation-in-part of Ser. No. 100,763, Dec. 6, 1979, abandoned.

[30] Foreign Application Priority Data

Dec. 6, 1978 [JP] Japan ................ 53-151807
Dec. 6, 1978 [JP] Japan ................ 53-151808
Dec. 6, 1979 [KR] Rep. of Korea ........ 79-4310[U]

[51] Int. Cl.³ .................... C08F 2/22; C08F 2/26
[52] U.S. Cl. ........................ 526/80; 525/86; 525/242; 526/342; 528/485
[58] Field of Search ........... 526/80, 342; 525/242

[56] References Cited

U.S. PATENT DOCUMENTS 2,851,447  9/1958  Wesp et al. ................ 526/342
3,010,936 11/1961  Irvin ......................... 526/342
3,491,071  1/1970  Lanzo ........................ 526/342
4,169,195  9/1979  Rinehart .................... 526/342

*Primary Examiner*—Stanford M. Levin
*Attorney, Agent, or Firm*—Jones, Tullar & Cooper

[57] ABSTRACT

A process for preparing a thermoplastic resin having high heat resistance by emulsion polymerization of an α-alkylstyrene compound of the formula:

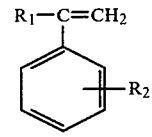

wherein $R_1$ is $C_1$-$C_3$ alkyl and $R_2$ is hydrogen, $C_1$-$C_3$ alkyl or halo($C_1$-$C_3$)alkyl and an unsaturated nitrile in a weight proportion of 65:35 to 80:20 in the presence of a radical initiator, characterized in that the whole amount of the α-alkylstyrene compound and 10 to 99% by weight of the unsaturated nitrile on the basis of its total amount are first subjected to polymerization and, after the polymerization, the remaining portion of the unsaturated nitrile is added to the reaction mixture and the resultant mixture is subjected to further polymerization until the polymerization is substantially completed.

6 Claims, No Drawings

LOW RESIDUAL MONOMER α-METHYLSTYRENE-ACRYLONITRILE COPOLYMERS AND ABS BLENDS THEREFROM

This is a continuation-in-part application of our co-pending application Ser. No. 100,763 filed on Dec. 6, 1979, now abandoned.

The present invention relates to a thermoplastic resin having excellent heat resistance and its production.

The so-called "heat-resistant ABS resins" obtained by blending styrene/acrylonitrile/butadiene graft polymers with α-methylstyrene/acrylonitrile copolymers are widely used in various fields due to their high heat resistance. Depending on the fields in which they are used, however, further enhancement of their heat resistance is desired.

The heat resistance of a heat-resistant ABS resin is greatly influenced by the heat resistance of the α-methylstyrene/acrylonitrile copolymer which forms a matrix in the heat-resistant ABS resin, and the heat resistance of the said copolymer depends upon its α-methylstyrene content. Thus, a higher α-methylstyrene content in the copolymer affords a higher heat resistance in the resulting heat-resistant ABS resin. However, α-methylstyrene generally shows low reactivity in radical polymerization and is difficult to polymerize in the absence of an appropriate copolymerizable monomer such as acrylonitrile. Therefore, when the amount of unreacted monomers remaining on completion of the polymerization is to be suppressed, limitation on the amount of α-methylstyrene to be used is necessary.

The highest α-methylstyrene content of the α-methylstyrene/acrylonitrile copolymer as presently employed is around 70% by weight, and the highest heat resistance temperature of the heat-resistant ABS resin blended with such copolymer is about 105° C. In the production of a α-methylstyrene/acrylonitrile copolymer having an α-methylstyrene content of 70% by weight according to a conventional process, there is always left unreacted monomers in an amount of more than 1% by weight based on the feed amount. In order to suppress the amount of the unreacted monomers remaining to below 1% by weight, the amount of α-methylstyrene to be used must be decreased. This causes the lowering not only of the heat resistance of the resulting copolymer but also of the heat resistance of the heat-resistant ABS resin blended therewith. By stripping a high monomer content latex reaction product it is possible to produce an α-methylstyrene/acrylonitrile copolymer having an α-methylstyrene content of more than 70% by weight with a final unreacted monomer content of less than 1% by weight, however the yield of the reaction product is decreased due to incomplete conversion. Further, such stripping requires a long time and is impractical for the industrial adoption. In addition, the cost of the reaction product is significantly increased.

Aiming at the production of an α-methylstyrene/acrylonitrile copolymer having a high α-methylstyrene content and therefore a high heat resistance while suppressing the amount of the unreacted monomers remaining in the reaction product, an extensive study has been made. As the result, it has been found that the emulsion polymerization of α-methylstyrene and acrylonitrile in two stages makes such production possible. The present invention is based on this finding.

According to the present invention, there is provided a process for preparing a thermoplastic resin by emulsion polymerization of an α-alkylstyrene compound of the formula:

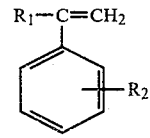

wherein $R_1$ is $C_1$–$C_3$ alkyl and $R_2$ is hydrogen, $C_1$–$C_3$ alkyl or halo($C_1$–$C_3$)alkyl and an unsaturated nitrile in a weight proportion of 65:35 to 80:20 in the presence of a radical initiator, characterized in that the whole amount of the α-alkylstyrene compound and 10 to 99% by weight of the unsaturated nitrile on the basis of its total amount are subjected to polymerization (1st stage polymerization), the remainder of the unsaturated nitrile is added thereto, and the resultant mixture is subjected to further polymerization (2nd stage polymerization).

Examples of the α-alkylstyrene compound are α-methylstyrene, α-ethylstyrene, methyl-α-methylstyrene, etc. Among them, preferred is α-methylstyrene. Examples of the unsaturated nitrile are acrylonitrile, methacrylonitrile, ethacrylonitrile, etc. Among them, preferred is acrylonitrile. Examples of the radical initiator are potassium persulfate, sodium persulfate, ammonium persulfate, cumene hydroperoxide, diisopropylbenzene hydroperoxide, etc. Among them, preferred are potassium persulfate and sodium persulfate.

As the emulsifier for formation of the emulsion system, there may be used any conventional one, but the use of an anionic emulsifier such as sodium laurylsulfate, potassium oleate, sodium oleate, potassium or sodium salts of fatty acids, potassium or sodium salts of rosin acids and sodium alkylbenzenesulfonate is favorable.

In carrying out the process of the invention, the whole amount of the α-alkylstyrene compound and 10 to 99% by weight of the unsaturated nitrile on the basis of its total amount are first subjected to emulsion polymerization. After the polymerization heat has substantially gone, the remainder of the unsaturated nitrile is added to the reaction system, and the resultant mixture is subjected to further emulsion polymerization. As the result of completion of the polymerization, there is produced a thermoplastic resin excellent in heat resistance in a latex state. The amount of the unreacted monomers in the reaction mixture can be less than 1% by weight on the basis of the feed amount. Since the unreacted monomer amount is very small, the adoption of stripping is not necessary.

The total weight proportion of the α-alkylstyrene compound and the unsaturated nitrile to be used in the first stage and second stage polymerizations is from 65:35 to 80:20. When the proportion of the α-alkylstyrene compound is lower than the lower limit, the heat resistance of the produced thermoplastic resin is deteriorated. When the proportion of the α-alkylstyrene compound is higher than the higher limit, the amount of the unreacted monomers in the ultimate reaction mixture exceeds 1% by weight to the feed amount.

The use of the unsaturated nitrile in a smaller amount at the first stage polymerization decreases the remaining amount of the unreacted monomers in the ultimate reaction mixture. However, if it is too small, the polymerization rate in the first stage polymerization becomes too slow so that the productivity is lowered. In addition, the stability of the latex obtained as the final product is deteriorated. On the other hand, the use of an unsaturated nitrile in a larger amount for the first stage polymerization increases the amount of the unreacted monomers in the ultimate reaction mixture. In addition, the heat resistance of the produced thermoplastic resin is lowered. Taking into consideration the unreacted monomer amount, the productivity, the stability of the latex, the heat resistance of the produced thermoplastic resin, etc., the amount of the unsaturated nitrile to be used at the first stage polymerization is preferred to be from 2.5 to 50% by weight, preferably from 10 to 40% by weight, to the whole amount of the α-alkylstyrene compound.

In order to obtain a thermoplastic resin having a higher content of the α-alkylstyrene compound units and therefore a higher heat resistance, the whole amount of the unsaturated nitrile is necessarily made smaller. Further, it is preferable to decrease the amount of the unsaturated nitrile to be used for the first stage polymerization and to increase the amount of the unsaturated nitrile to be used for the second stage polymerization. Specifically, the use of the unsaturated nitrile in an amount of 10 to 99% by weight, preferably of 20 to 95% by weight, to its whole amount at the first stage polymerization is favorable, and within such range, smaller is more desirable.

As to the manner of addition of the monomeric compounds to the reaction system at the first stage and second stage polymerizations, no limitation is present. They may be added to the reaction system once as the whole or continuously. If necessary, a chain transfer agent or any other additive may be added to the reaction system.

The thermoplastic resin produced by the process of the invention has per se an excellent heat resistance and therefore can be employed by itself for various uses. Also, the thermoplastic resin may be blended with any other thermoplastic resin such as an ABS resin, a polycarbonate resin or a polyvinyl chloride resin so as to obtain a blended product having a high heat resistance. Advantageously, it has a good compatibility with those other thermoplastic resins.

Practical and presently preferred embodiments of the present invention are illustratively shown in the following examples.

EXAMPLES 1 TO 5

Emulsion polymerization was carried out using the materials as shown in Table 1. Namely, a 3 liter volume reactor was flushed with nitrogen gas, and t-dodecylmercaptan, sodium laurylsulfate, potassium persulfate and deionized water were charged therein. After introduction of 3/10 of the total weight of a mixture of α-methylstyrene and acrylonitrile into the reactor, the temperature was raised up to 70° C., and stirring was continued for 1 hour. Then, the remaining 7/10 of the monomeric mixture was continuously added to the reaction system for 3 hours, during which the polymerization proceeded (the first stage polymerization).

After the polymerization heat had gone, acrylonitrile was added to the reaction system continuously for 1 hour, and further polymerization was continued at 70° C. for 3 hours (the second stage polymerization).

After the polymerization was completed, the amounts of the unreacted monomers in the reaction mixture and the glass transition point of the produced thermoplastic resin were determined by conventional procedures. The results are shown in Table 1.

TABLE 1

| Example | 1 | 2 | 3 | 4 | 5 |
|---|---|---|---|---|---|
| 1st Stage polymerization | | | | | |
| α-Methylstyrene (g) | 700 | 700 | 700 | 750 | 800 |
| Acrylonitrile (g) | 50 | 210 | 250 | 150 | 80 |
| t-Dodecylmercaptan (g) | 0.5 | 0.5 | 0.5 | 0.5 | 0.5 |
| Sodium laurylsulfate (g) | 20 | 20 | 20 | 20 | 20 |
| Potassium persulfate (g) | 5 | 5 | 5 | 5 | 5 |
| Deionized water (g) | 1200 | 1200 | 1200 | 1200 | 1200 |
| 2nd Stage polymerization | | | | | |
| Acrylonitrile (g) | 250 | 90 | 50 | 100 | 120 |
| Unreacted monomers*[1] | | | | | |
| α-Methylstyrene (wt%) | 0.45 | 0.53 | 0.58 | 0.81 | 0.90 |
| Acrylonitrile (wt%) | 0.20 | 0.10 | 0.10 | 0.11 | 0.08 |
| Glass transition point (°C.)*[2] | 124 | 122 | 122 | 130 | 137 |

Notes:
*[1]Remaining amount based on the total feed amount (α-methylstyrene + acrylonitrile).
*[2]Determined by the DSC (differential scanning calorimeter) method.

COMPARATIVE EXAMPLES 1 TO 4

Emulsion polymerization was carried out using the materials as shown in Table 2. Namely, a 3 liter volume reactor was flushed with nitrogen gas, and t-dodecylmercaptan, sodium laurylsulfate, potassium persulfate and deionized water were charged therein. After introduction of 3/10 of the total weight of a mixture of α-methylstyrene and acrylonitrile into the reactor, the temperature was raised up to 70° C., and stirring was continued for 1 hour. Then, the remaining 7/10 of the monomeric mixture was continuously added to the reaction system for 4 hours, during which the polymerization proceeded.

After the polymerization was completed, the amounts of the unreacted monomers in the reaction mixture and the glass transition point of the produced thermoplastic resin were determined by conventional procedures. The results are shown in Table 2.

TABLE 2

| Comparative Example | 1 | 2 | 3 | 4 |
|---|---|---|---|---|
| α-Methylstyrene (g) | 650 | 700 | 750 | 800 |
| Acrylonitrile (g) | 350 | 300 | 250 | 200 |
| t-Dodecylmercaptan (g) | 0.5 | 0.5 | 0.5 | 0.5 |
| Sodium laurylsulfate (g) | 20 | 20 | 20 | 20 |
| Potassium persulfate (g) | 5 | 5 | 5 | 5 |
| Deionized water (g) | 1200 | 1200 | 1200 | 1200 |
| Unreacted monomers*[1] | | | | |
| α-Methylstyrene (wt%) | 1.02 | 1.31 | 5.70 | 8.24 |
| Acrylonitrile (wt%) | 0.11 | 0.07 | 0.06 | 0.05 |
| Glass transition point (°C.)*[2] | 113 | 115 | 122 | 127 |

Notes:
*[1]Remaining amount based on the total feed amount (α-methylstyrene + acrylonitrile).
*[2]Determined by the DSC (differential scanning calorimeter) method.

REFERENCE EXAMPLE

Into a 3 liter volume reactor flushed with nitrogen gas, polybutadiene latex (600 g in terms of solid) and potassium persulfate (3 g) were charged, and deionized water was introduced therein to make the contents of the reactor equal to 1800 grams. The temperature was raised up to 70° C., and styrene (330 g), acrylonitrile (170 g) and sodium laurylsulfate (15 g) were continuously added to the reactor in 2 hours. Thereafter, aging was carried out at 70° C. for 2 hours to produce an ABS graft polymer.

The above prepared ABS graft polymer in a latex state (30 parts by weight in terms of solid) and the thermoplastic resin in a latex state produced in Example 2 or Comparative Example 2 (70 parts by weight in terms of solid) were mixed together, and aluminum sulfate was added thereto for salting out. The collected resinous composition was subjected to measurement of some physical properties. The results are shown in Table 3.

TABLE 3

| Resinous composition | Thermoplastic resin used | Heat resistance (°C.)*1 | Impact strength (kg/cm²)* | Processability (ml/min)*3 |
|---|---|---|---|---|
| A | Example 2 | 112 | 14.6 | 0.17 |
| B | Comparative Example 2 | 105 | 13.8 | 0.17 |

Notes:
*1 determined according to ASTM D-648.
*2 determined according to ASTM D-256 (¼", 20° C.).
*3 measured by the use of a Koka type flow tester (230° C., 60 kg/cm²).

What is claimed is:

1. A process for preparing a thermoplastic resin having high heat resistance by emulsion polymerization of a monomer mixture consisting essentially of α-alkylstyrene compound of the formula:

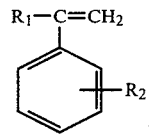

wherein $R_1$ is $C_1-C_3$ alkyl and $R_2$ is hydrogen, $C_1-C_3$ alkyl or halo($C_1-C_3$)alkyl and an unsaturated nitrile in a weight proportion of 65:35 to 80:20 in the presence of a radical initiator, characterized in that the whole amount of the α-alkylstyrene compound and 10 to 99% by weight of the unsaturated nitrile on the basis of its total amount are first subjected to polymerization and, after the polymerization, the remaining portion of the unsaturated nitrile is added to the reaction mixture and the resultant mixture is subjected to further polymerization until the polymerization is substantially completed.

2. The process according to claim 1, wherein the amount of the unsaturated nitrile to be used for the first polymerization is from 20 to 95% by weight on the basis of the total amount of the unsaturated nitrile.

3. The process according to claim 1, wherein the amount of the unsaturated nitrile to be used for the first polymerization is from 2.5 to 50% by weight on the basis of the whole amount of the α-alkylstyrene compound.

4. The process according to claim 3, wherein the amount of the unsaturated nitrile to be used for the first polymerization is from 10 to 40% by weight on the basis of the whole amount of the α-alkylstyrene compound.

5. The process according to claim 1, wherein the α-alkylstyrene compound is α-methylstyrene.

6. The process according to claim 1, wherein the unsaturated nitrile is acrylonitrile.

* * * * *